March 7, 1944.          H. F. ELLIOTT          2,343,540
ELECTRIC CONTROL APPARATUS
Filed July 21, 1941          6 Sheets-Sheet 1

Inventor:
Harold F. Elliott
By Foorman L. Mueller
Atty.

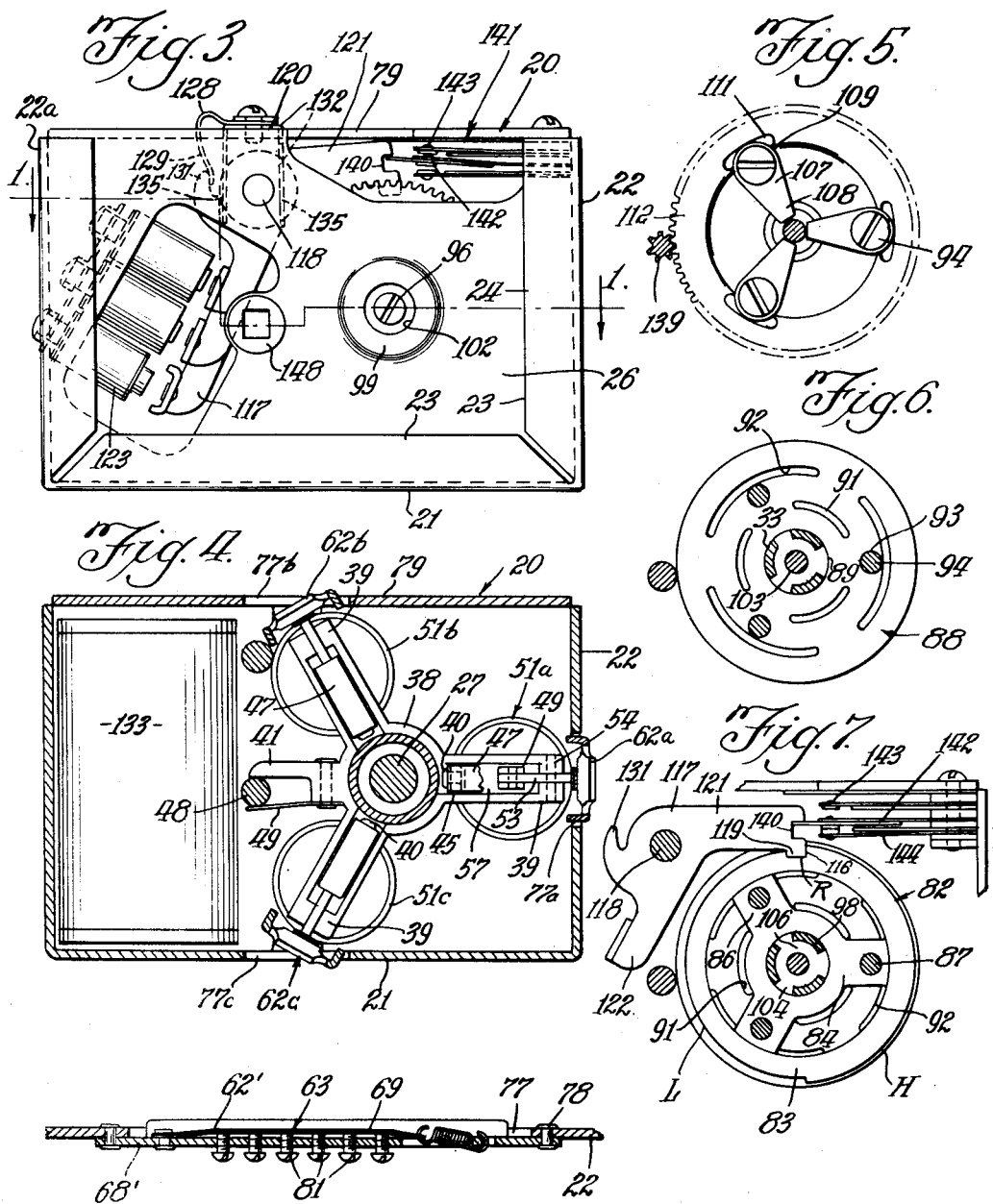

March 7, 1944.  H. F. ELLIOTT  2,343,540
ELECTRIC CONTROL APPARATUS
Filed July 21, 1941  6 Sheets-Sheet 3

Inventor
Harold F. Elliott
By Foorman L. Mueller
Atty.

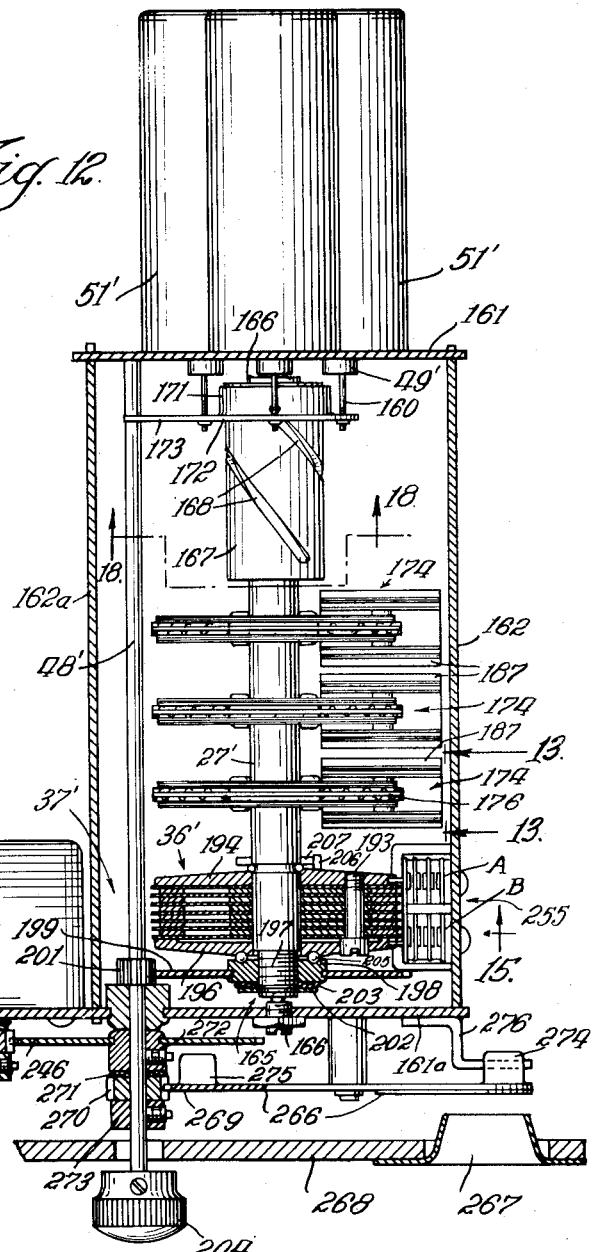

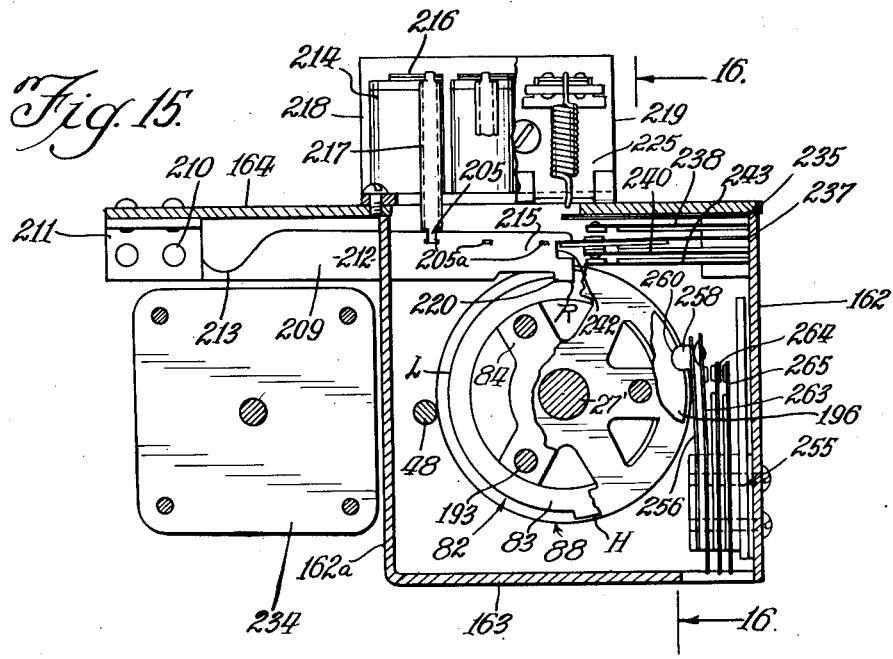
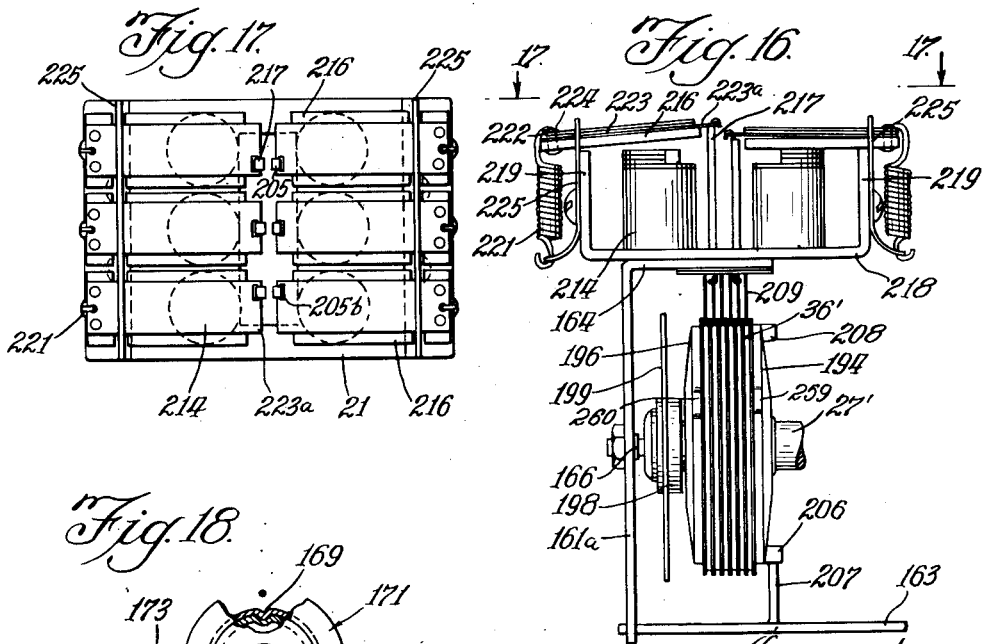
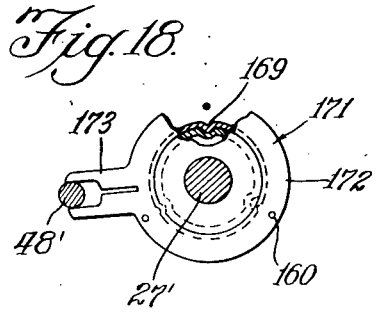

Patented Mar. 7, 1944

2,343,540

UNITED STATES PATENT OFFICE 2,343,540

ELECTRIC CONTROL APPARATUS

Harold F. Elliott, Palo Alto, Calif.

Application July 21, 1941, Serial No. 403,450

18 Claims. (Cl. 250—20)

This invention relates in general to control apparatus and more in particular to electric tuning apparatus for a radio receiver.

It is an object of this invention to provide improved electrically-operated control apparatus which can be readily applied to many types of controllable mechanism including automobile radio receivers and radio receivers for home use.

A further object of this invention is to provide a compact, simple, and inexpensive electrically-operated control apparatus which is comprised of a minimum of readily available commercial parts adapted to be pre-assembled into a unit which operates with precision and efficiency.

Another object of this invention is to provide a tuning device for a radio receiver in which a plurality of inductance units are adapted to be set in a predetermined matched relation at each desired tuning position by means capable of also retaining such relation during the usual operation of the device.

Yet another object of this invention is to provide a tuning device in which inductance tuning means are complemented by capacitance tuning means at each desired tuning position by an amount sufficient to compensate for the inaccuracies in inductance tuning at such tuning position.

Another object is to provide a radio tuning device in which inductance tuning means is complemented by capacitance tuning means in a predetermined relation at a plurality of tuning positions, the relation being maintained in the normal operation of the tuner by means including a common operating member for such inductance and capacitance tuning means.

A still further object is to provide electric control apparatus which operates very quickly and positively, and which is simply adjusted to various predetermined control positions without the use of special tools or the like.

A particular feature of this invention is found in the provision of a plurality of inductance tuning units having core elements adapted to be simultaneously moved by a common driving member to a plurality of tuning positions, with each of said elements being operatively associated with a corresponding adjustable cam means which acts to individually adjust each core independently of the relation therebetween as established by their connection with the common driving member.

Another feature of this invention is found in the provision of a variable condenser unit including a fixed plate and a movable plate, with the movable plate being adapted to be continuously moved relative to the fixed plate during operation of the control apparatus with which it is employed so as to continuously vary the capacity of the condenser.

A feature of this invention is the provision of electric tuning apparatus for a radio receiver in a pre-assembled unit which can be completely assembled and tested under operating conditions before it is ever assembled into the receiver.

Another feature of this invention is the provision of adjustable control structure which includes a plurality of axially mounted rings having only a mechanical function in the operation of the control structure, and being individually adjustable independent of other rings in the structure.

A further feature of this invention is the provision of a cooperating latch for each of the control rings in the control apparatus which is of a flat construction and adapted to be flexibly movable in a direction substantially at right angles to the plane thereof, while rigidly secured at one end.

A still further feature of this invention is the provision of a simple clamping mechanism for varying the friction on the control rings in the control apparatus of the invention to permit their individual angular adjustment and likewise maintain them positively fixed in an adjusted position.

A still further feature of this invention is found in the provision of a tuning unit having frame means integrally formed with a base and side members, with all of the elements of the tuning unit being operatively arranged entirely within the confines of such base and side walls and completely supported thereon.

Another feature of this invention is found in the utilization of the tuning motor of the tuning device for a radio receiver in operating the power supply switch for such receiver.

Further objects, features and advantages of this invention will appear from the following description when taken in connection with the accompanying drawings in which:

Fig. 3 is an end view looking toward the right as viewed in Fig. 2 showing the assembly relation of the latches with their corresponding control rings and actuating magnets;

Fig. 4 is a sectional view as seen along the line 4—4 in Fig. 1 illustrating the assembly relation of the inductance units and control member;

Figure 1:
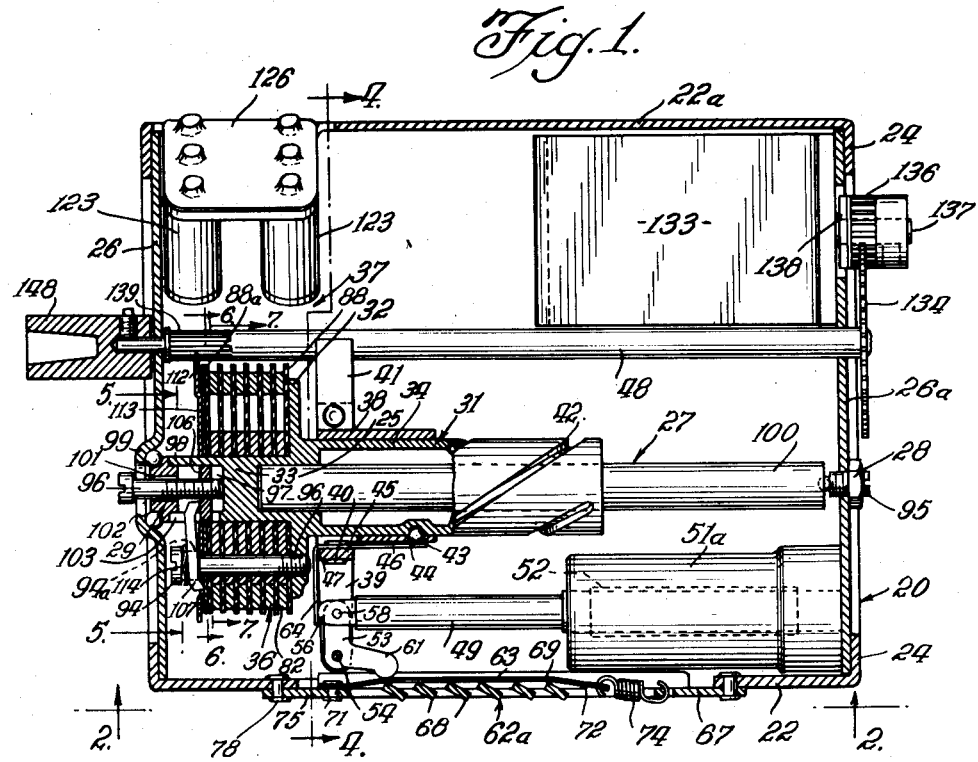
Fig. 1 is a sectional plan view of one embodiment of the invention as seen along the line 1—1 in Fig. 3 showing the assembly relation of inductance tuning units, a control member and the control mechanism for operating the control member.
Figure 2:
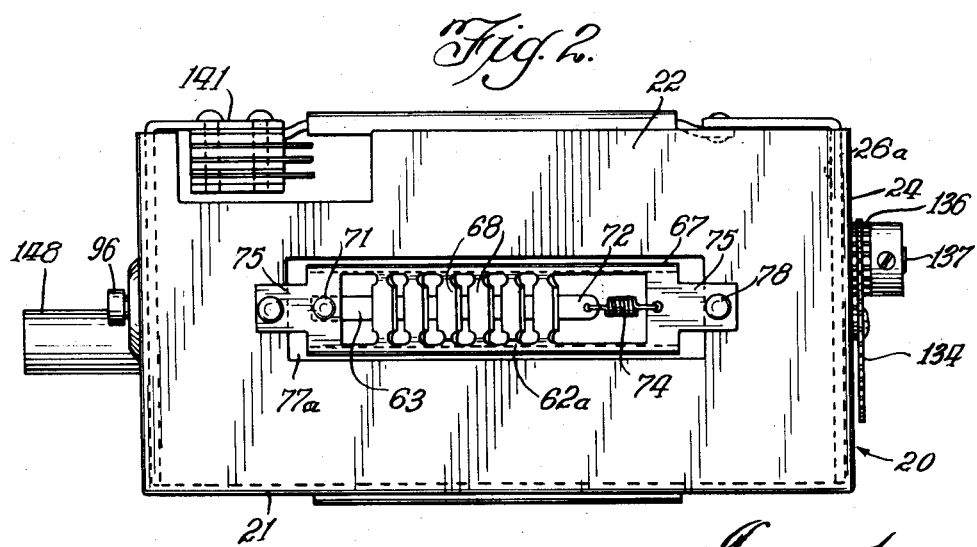
Fig. 2 is a side view as seen along the line 2—2 in Fig. 1 showing the cam means associated with each of the inductance units for individually adjusting the same.
Figures 10, 11:
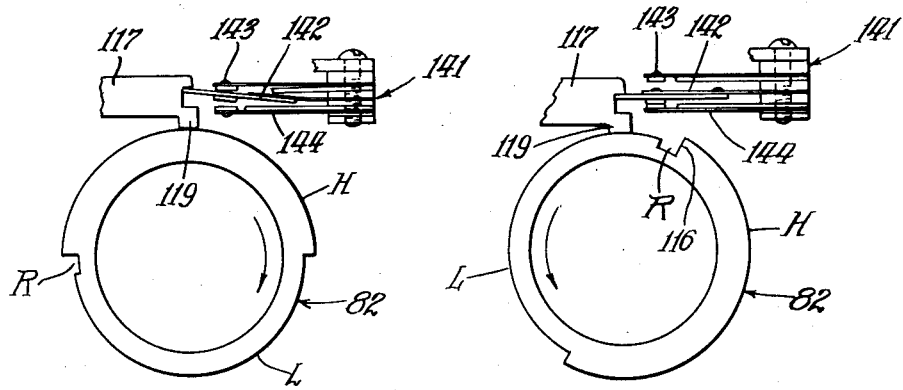
Figure 9:
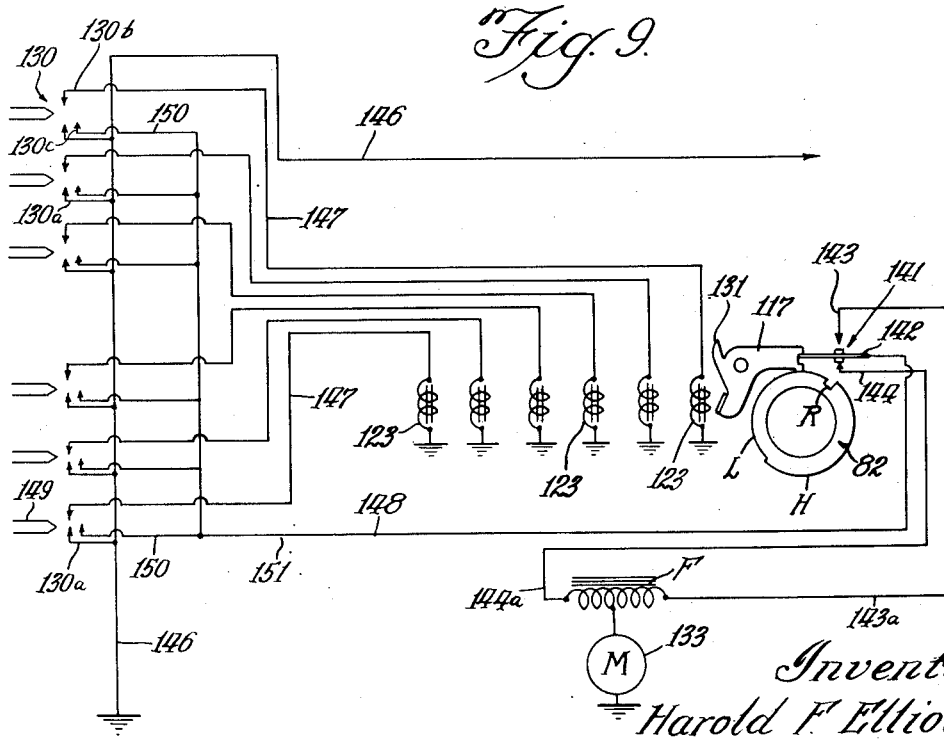
Figure 19:
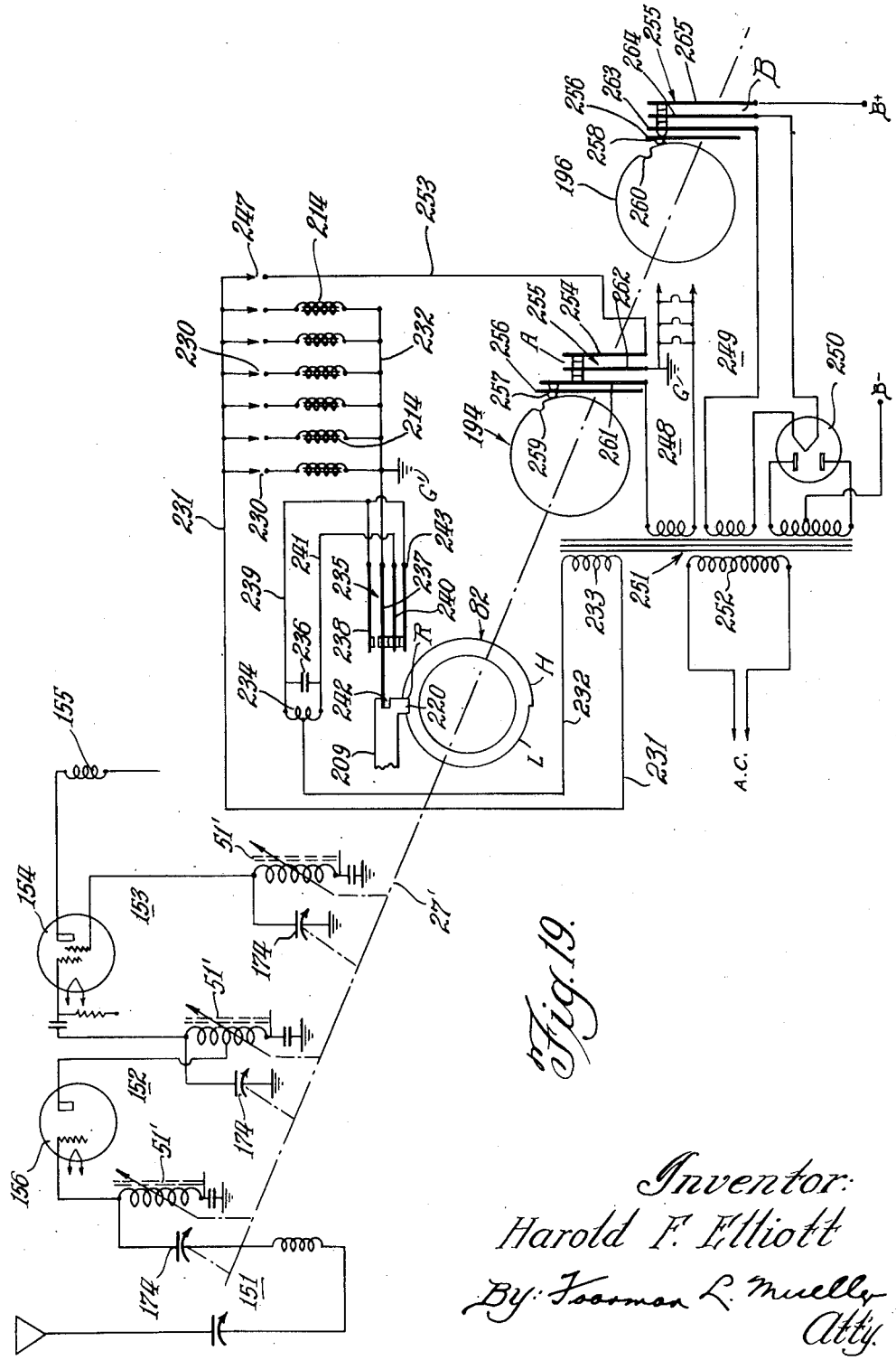

Figs. 5, 6, and 7 are sectional views of the control member assembly seen along lines 5—5, 6—6, and 7—7, respectively, in Fig. 1;

Fig. 8 is a fragmentary sectional view of a modified form of adjustable cam means for the inductance units in the embodiment of Fig. 1;

Fig. 9 is a circuit diagram for the tuning unit of Fig. 1;

Figs. 10 and 11 are schematic views illustrating a control ring and associated latch in changed operating positions;

Fig. 12 is a plan view of a modified form of the invention;

Fig. 13 is an enlarged end view of a condenser unit employed in the unit of Fig. 12, as seen along the line 13—13 in Fig. 12;

Fig. 14 is a fragmentary sectional view of the condenser unit as seen along the line 14—14 in Fig. 13;

Fig. 15 is a sectional view taken along the line 15—15 in Fig. 12;

Fig. 16 is a fragmentary end view looking along the line 16—16 in Fig. 15;

Fig. 17 is a fragmentary plan view showing the assembly arrangement of the magnets and armatures used in the unit of Fig. 12;

Fig. 18 is a sectional view taken on line 18—18 in Fig. 12 with parts thereof being broken away for the purpose of clarity; and Fig. 19 is a schematic diagram showing the electrical control circuits for the tuning device of Fig. 12 and for a radio receiver with which it is employed.

In the practice of this invention there is provied a tuning unit for a radio receiver having unitary frame means comprised of a base and integrally assembled end and side plate members. A rotary control member is supported for rotation in the end plates and is operatively connected near one of its ends with control mechanism therefor. The tuning circuit for the radio receiver includes variable tuning means operatively connected with the control member near the other end thereof, the tuning means, control member, and the control mechanism being entirely within the confines of the end plates of the frame means. The control mechanism includes a control member or ring assembly which is electrically operated by selectively actuated electrical means and adapted to rotate the control member to control positions corresponding to predetermined tuning positions. The variable tuning means in the tuning unit may be either of inductance or capacitance type or a combination of both types. When inductance tuning alone is employed there is provided a plurality of inductance units having core elements simultaneously movable to a plurality of tuning positions by a common driving member, but each of which is acted on by a corresponding cam means so as to be individually adjusted to different relative positions at each tuning position. Such individual adjustment of each core of the inductance units provides for a predetermined matching of the inductance units in the tuning circuit over a complete range of frequencies. Where inductance and capacitance tuning are used together, the capacitance tuning means is adjusted in a complementary relation with the inductance tuning means at each of the selected station frequencies to provide for predetermined tuning characteristics of the tuning circuit over a desired frequency range. Both of the tuning means are concurrently driven by a rotary control member, the effective inductance and capacitance in the tuning circuit being varied simultaneously and in accordance with the predetermined adjusting thereof to retain their complementary tuning relation.

With reference to the drawings the invention is shown in Figs. 1-4 as including frame means 20 having an integrally formed base 21 and side plates 22 and 22a, with the end portions of this integral structure being provided with inwardly extending flanges 23. Each end plate 26 and 26a of the frame means 20 is fitted between the side plates 22 and 22a and against the flanges 23 for securement thereto as by welding or like means. It is thus seen that the frame means 20 is of a rigid and unitary construction so that any relative loosening between the parts thereof is completely eliminated.

Extending longitudinally of the frame means 20 is a rotary control member 27 which is rotatably supported at one end in the end plate 26a by a bearing member 28 and at its opposite end 25 in the end plate 26 by bearing means 29, the assembly of the bearing means 28 and 29 in the end walls 26a and 26, respectively, being such that the control member 27 is completely positioned therebetween. The control member 27 at its end 25 is provided with a cylindrical body portion 31 having hub portions 33 and 34 of different diameters separated by an annular flange 32. As is clearly illustrated in Fig. 1 the flange 32 is arranged intermediate the ends of the body portion 31, with hub portion 33 being positioned toward the end wall 26. A control member unit 36, to be later fully explained, and which forms a part of the control mechanism designated generally as 37 for the rotary control member 27, is adapted to be mounted on the hub portion 33 and against the flange 32. Mounted for slidable movement on the hub portion 34 is a sleeve or bushing member 38 integrally formed with spaced radially extending driving arms 39 and a radially extending guiding arm 41 arranged between a pair of adjacent ones of the arms 39 (Fig. 4). The hub portion 34 is formed in the periphery thereof with spaced spirally extending grooves 42 which are adapted to receive in following engagement a corresponding ball portion 43 seated in a recess or opening 44 in the sleeve or sliding member 38. Each ball 43 is retained in a corresponding recess by one end 46 of a spring 47 which is of flat form and bent at a substantially right angle. The spring at the bend therein is secured by a rivet 40 to an inner portion 45 of a corresponding arm 39. (Fig. 1.) The guiding arm 41 (Fig. 4) slidably engages one side of a driving and manual control shaft 48 which extends longitudinally of the frame means in a parallel relation with the control member 27 and is rotatably supported in the end plates 26 and 26a. The guiding arm 41 has a flat spring member 49 for slidably engaging an opposite side of the driving shaft 48, which serves as a guideway for the driving member 38. It is evident, therefore, that on rotation of the control member 27, the sleeve or driving member 38 is retained against rotation by the coaction of the guiding arm 41 and its associated spring 49 with the shaft 48. However, since the ball portions 43 follow the spiral grooves 42 the sleeve 38 is slidably moved on the hub portion 34 in a direction axially of the control member 27, the guiding arm 41 and spring 49 in turn being slidably moved along the shaft 48. This linear translation or movement of the sleeve 38 in response to a rotation of the control member 27 is utilized in moving the adjustable core elements 49 of the inductance tuning units 51a—51c to their tuning positions as will now be fully explained.

The tuning units 51a—51c correspond in number to the radial arms 39 and are angularly spaced about the control member 27 (Fig. 4) with each unit being carried on the end plate 26a. Since the assembly of each inductance unit 51a—51c with a corresponding radial arm 39 is the same, only the assembly for the inductance unit 51a will be referred to in the following description.

As shown in Fig. 1, the core 49 is arranged for adjustable movement in a direction axially of the control member 27 and within its corresponding coil 52. Thus by connecting the free end of the core 49 to the arm 39 the core may be moved to a tuning position in direct response to a rotation of the shaft 27 by virtue of the sliding of the sleeve 38 axially of the shaft 27. However, in the tuning function accomplished by the relative motion between the core and the coil in the inductance unit 51, it is essential that the core be placed in a correct position with respect to the coil for each tuning position so that the effective inductance in the tuning circuit will be of a value providing for uniform tuning performance over a predetermined frequency range. Because of difficulties encountered in obtaining commercially available coils and cores of like electrical characteristics, and of establishing a precise relation between the coil and core by merely mounting the coils on an appropriately designed rigid foundation plate such as the plate 26a, it is advisable that the core be individually adjustable with respect to its cooperating coil independently of the initial relation established therebetween through the connection of the core with its driving member which in the present invention, is the sleeve unit 38.

This individual adjustment of the core and coil is accomplished by means including a crank arm 53 which is pivotally connected by axis means 54 to the outer end of arm 39. The end 56 of the crank arm 53 is movable within an opening 57 (Fig. 4) formed in the arm 39, and is pivotally connected as indicated at 58 to the outer end of the core element 49. The opposite end 61 of the crank arm functions as a follower relative to a cam surface 63 for cam means indicated generally as 62a. The crank arm end 61 is retained in operative engagement with the cam surface 63 by the pressing engagement of the end 64 of the spring 47 on the core element 49. The spring 47 thus provides a resilient holding pressure on the ball portion 43 in the sleeve member 38, and acts to minimize lost motion in the connection between the core element 49 and its driving arm 39.

The cam means 62a is comprised of a longitudinally extending plate member 67 having transversely extending louvres or blades 68 spaced longitudinally thereof. The cam surface 63 is comprised of a plurality of flexible bands 69 composed of thin strips of bronze or like material, which extend longitudinally of the plate and over the blades 68, the end 71 thereof being fixed to the plate, while the end 72 is yieldably connected with the plate through a spring 74. The bands 69 are thus retained under tension against the blades 68. By deflecting the blades 68 at varying angles laterally of the plate 67, the shape of the cam surface 63 is varied. Any contour of the cam may thus be obtained while maintaining a continuous cam surface. The plate 67 is adapted for positioning in an opening 77 formed in the side wall 22 of the frame 20 and is secured at its ends 75 to such side wall by screws or rivets 78. With reference to Fig. 4 it is seen that the cam means 62b and 62c for the remaining two inductance units 51b and 51c, respectively, are positioned in openings 77b and 77c, respectively, formed in the top plate 79 and base plate 21, respectively, of the frame means 20. In order that the cam surfaces 63b and 63c be positioned at substantially right angles to their corresponding arms 39 the cam means 62b and 62c are inclined relative to their respective supporting walls.

As was previously noted the sleeve member 38 in response to a rotation of the control shaft 27 serves to simultaneously move all of the core elements 49 to relative tuning positions. However, because of the cooperating action of the crank arm 53 and the cam means 62 for each inductance unit 51a—51c, variations in the cam surface 63 act to retard or accelerate the movement of each core element 49 relative to each other and to the movement of the sleeve member 38. As a result of this varying speed of travel of each core element 49 while the sleeve member 38 moves at a substantially uniform speed, each core element is individually adjusted with particular reference to its associated coil. A relative positioning of each core in its respective coil for each tuning position may thus be precisely set by the cam means to provide for a predetermined matching of the inductance units at each tuning position and consequent high tuning performance over a wide frequency range. The tuning inaccuracies usually encountered in inductance tuning of this type are thus practically eliminated. It is unnecessary, therefore, that the electrical characteristics of the cores and coils constituting the inductance units be closely matched as to electrical characteristics, since variations in their electrical characteristics resulting from the usual inaccuracies in their manufacture, are entirely compensated for by the proper adjustment of the cam means 62 for each inductance unit 51a—51c. Usual commercially available parts for the inductance units 51a—51c may be thus readily utilized to provide at relatively low cost a tuning device having high tuning performance.

A modified form of cam means 62' which may be employed with each of the inductance units 51a—51c is illustrated in Fig. 8, and includes a plate member 68' having a plurality of screws 81 threadable therein for adjustment. The adjustment portions of the screws 81 are positioned outwardly of the side plate 22 so as to be readily accessible for manipulation. The inner ends of the adjusting screws 81 are engageable with the strips 69 forming the cam surface 63, rotation of the screws varying the contour of the cam surface 63 in an obvious manner. The operation of the cam means 62' and its assembly in the tuning device is similar in all respects to that of the cam means 62a so that a further description thereof is believed to be unnecessary.

A rotation of the control shaft 27 to control positions corresponding to predetermined tuning positions of the inductance units 51a—51c is accomplished by the control mechanism 37, previously mentioned, and including the control member assembly 36 which is mounted on the hub portion 33 of the sleeve member 34 and against the annular flange 32 thereon. The control member assembly 36 is comprised of a plurality of identical control rings 82 (Fig. 7) having a separable peripheral portion 83 and a hub portion 84. The hub portion 84 is adapted to be mounted on the hub 33 and is integrally formed with spaced radial projections 86, each of which is provided with an aperture 87 and the outer ends of which are of arcuate contour for mating engagement with the inner periphery of the peripheral portion 83. Intermediate each two control rings 82 and on the outside of the control assembly at each end thereof are identical separators or friction discs 88 (Figs. 1 and 6). Each disc 88 is formed with a central opening 89, for mounting on the hub 33, and concentrically arranged arcuate slots 91 and 92 which facilitate the flexing of the disc in a direction axially thereof. Angularly spaced apertures 93 in each separator correspond to the apertures 87 in the hub portion 84 of a control ring 82, the hub portions 84 and separators 88 being secured to the back support or annular flange 32 against angular movement with relation thereto by means of screws 94 extending through said apertures. Each screw 94 is threadably secured in a corresponding threaded aperture 95 in the annular flange 32.

The discs or separators 88 are provided in a thin flexible fibre composition material. As can be seen from Figs. 1 and 6, the screws 94 extend through the separators radially inwardly of the arcuate slots 92 so that the ring-like outer portion of each separator is adapted to flex axially slightly at the outer circumference due to the positioning of the arcuate slots 92 between the fastening screws 94 and the circumference of the disc. Although these discs positively separate the control rings 82 they do permit of a slight axial movement of the rings so as to permit the control ring assembly to open up enough to provide for an angular adjustment of the peripheral portion 83 of each control ring relative to its corresponding hub portion 84, and hence for an angular adjustment of the ring 82 relative to the control member 27. As previously described, the separators are all fixed with reference to the flange 32 and prevent the angular movement of the peripheral portions of the rings 82 disturbing one another during adjustment. Due to the thinness of the separators and control members, the entire control ring assembly is very narrow as can be seen in Fig. 1 to in turn assist in making the entire unit relatively narrow and very compact.

In the operation of the control apparatus and after the control rings or members 82 are each set to a predetermined angular position with reference to the control shaft 27, as will be explained, the members 82 and the friction discs 88 are compressed axially as an assembly and frictionally retained against movement relative to the flange 32 and hence to the shaft 27. The necessary frictional pressure is obtained by friction mechanism which includes a screw 96 extending into a cavity 97 formed in the outer end 98 of the hub portion 33. The means 29 for rotatably supporting the end 25 of the control member 27 is adapted to be received in a bulged out portion 99 formed in the end wall 26, the portion 99 and the bearing support 29 being provided with concentric openings 101 and 102 which are arranged coaxially with the cavity 97. The end 98 of the hub 33 is operatively connected with the supporting means 29, this engagement and the support of the bearing 29 in the bulged out portion 99 being retained by suitable adjustment of the thrust element 95 in the bearing 28 at the opposite end 100 of the control shaft 27. By virtue of the aligned arrangement of the openings 101 and 102 and the cavity 97, the screw 96 is capable of being extended therethrough in a direction longitudinally of the axis of the control shaft 27, with one end thereof bearing against the bottom of the cavity 97, and the opposite end thereof projecting outwardly from the end plate 26 as shown in Fig. 1. From a consideration of Figs. 1, 6 and 7, it is seen that the wall or the hub portion about the cavity 97 is formed with angularly spaced slots 103 adapted to receive in sliding engagement radially extending projections 104 provided on a threaded support 106 for the threaded member 96, the support 106 being located within the cavity 97. On rotation of the threaded member 96, therefore, the threaded support 106 is axially but non-rotatably movable within the cavity 97.

Clamping levers 107 (Figs. 1 and 5) are arranged to extend radially outwardly in a spaced angular relation from the axis of the control shaft 27. Each lever 107 has one end 108 thereof adapted to be received within a corresponding one of the slots 103 for resting support on the threaded member 106. As illustrated the slots 103, supporting member projections 104 and clamping levers 107 are three in number. It is to be understood, of course, that any number may be provided depending upon the particular design of the control member assembly 36. The opposite end 109 of each clamping lever 106 (Fig. 5) is adapted to be inserted through a slot 111 formed in a gear member 112 which is driven in engagement with the driving shaft 48 previously mentioned. The gear 112 is mounted on the hub 33 at one end of the control assembly 36, a metal separator 113 being positioned between the gear 112 and the outer separator disc indicated as 88a, the purpose of the metal disc 113 being to prevent any injury to the fibre disc 88a by the action of the clamping levers 107. Each lever 107, intermediate the ends 108 and 109 thereof, is supported on a shoulder portion 94a on a corresponding one of the screws 94. A spring washer 114 is positioned between the lever 107 and the screw head and the lever fits loosely around the shoulder 94a to provide for a slight pivotal action of the lever relative to the screw.

Referring to Fig. 1 it is seen that the slotted openings 103 formed in the wall of the cavity 97 extend from the end 98 of the hub 33 to a point within the confines of the control assembly 36. Since the threaded support 106 is axially movable over the entire length of the cavity 97, a support of the lever ends 108 thereon when it is in an innermost position is accomplished by bending such lever ends in a direction toward the bottom of the cavity 97. Thus it is apparent that the clamping levers 107 may be arranged in close proximity to the outer end of the control assembly 36, to provide for a compact assembly of the clamping levers and the control assembly 36 in a minimum of space axially of the control member 27.

As above described the separator discs 88 and the hub portion 84 of the control rings 82 are secured against angular and axial movement relative to the control member 27 by virtue of their being secured to the annular flange 32 by the screws 84. Thus on any application of pressure through the clamping levers 107, the circumferential portions of the discs 88 and the peripheral portions 83 of the control rings 82 are pressed together to hold them in fixed positions, with a release of such pressure permitting axial flexing of the circumferential portions of the discs 88 and hence permitting angular movement of the peripheral portions 83 of the control rings 82 therebetween. It is understood, of course, that the peripheral portions 83 are rotatable on the hub projections 86. The friction or clamping pressure is applied upon rotating the threaded member 96 in a clockwise direction for a right-hand thread, for instance, the threaded support 106 being moved axially but non-rotatably to the left, as viewed in Fig. 1, to increase the bearing pressure of the lever ends 109 against the metal disc 113 and in turn against the control member assembly. In removing friction, the threaded support 96 is rotated in an opposite direction, the spring washer 114 acting to maintain a nominal pressure upon the ring portions 83 to hold them in position during adjustment.

Each control ring 82 is preferably formed by a punching or stamping operation, from a single piece of material. Inasmuch as the function of a control ring is purely mechanical and not electrical, it can be provided in any material desired. The peripheral or ring portion 83 of each control ring 82 includes a high side H and a low side L (Fig. 7) each extending over slightly less than 180° to the outer surface of the ring, and separated at one of their ends by a recess R. A stop shoulder 116 is provided on one side of the recess R at the high side H of the ring. Cooperating with each ring 82 is a corresponding latch 117 pivotally mounted on a fixed shaft 118 carried by the frame means 20. In the present embodiment six latches are employed corresponding in number to the six control rings 82 illustrated in Fig. 1. In order to provide as compact an assembly as possible and to provide adequate mounting and operating space for the latches and yet maintain the tips 119 of the latch arms 121 in alignment axially of the control assembly 36, the six latches are pivoted on the same shaft 118. Each armature arm 122 of a latch 117 is operatively associated with a corresponding magnet 123 which are arranged in two parallel rows of three magnets each (Fig. 1) and supported on a bracket 126 mounted on the wall members 22a and 26 opposite the control assembly 36. The armature arms 122 of the latches 117 are held in an open position relative to magnets 123 by a comb spring unit 128 carried by a bracket 120 on the top wall 79 of the frame 20 and having a spring tooth 129 corresponding to and engaging an ear 131 on each latch 117. A comb spacing unit 132 of substantially U-shape (Fig. 3) is also carried by the bracket 120 and is provided with spaced teeth 135 each of which is adapted to be inserted between adjacent ones of the latches 117 and on opposite sides of the shaft 118 to maintain the latches axially positioned on the shaft 118.

The magnets 123 are electrically connected as shown in Fig. 9 so as to be individually and selectively energized on actuation of corresponding push button units 130. Each push button unit has one terminal 130a thereof connected to a common lead line 146, with the other terminal 130b thereof being connected through a corresponding conductor 147 to ground in series with a corresponding magnet 123. A third terminal 130c adapted to be contacted by the push button plunger 149 after the closing by the plunger of terminals 130a and 130b is connected through corresponding conductors 150 and common lead line 151 into the circuit of a motor 133 which drives the control shaft 27. Thus on pushing of a button 149 to the right as viewed in Fig. 9, a corresponding magnet 123 is first energized by the closing of contacts 130a and 130b, with continued movement of the button 149 toward the right closing the circuit for the motor 133 as will be later explained. The motor 133 is thus energized substantially concurrently with each of the magnets 123. On release of the button 149 it is evident that the motor will be deenergized prior to a deenergization of the selected magnet 123. The motor 133 is mounted within the frame means 20 opposite the inductance units 51a—51c, and is operatively connected with the drive shaft 48 through gears 134 and 136, mounted on the drive shaft 48 and motor shaft 137, respectively (Fig. 1). The gear 136 is in driven engagement with the motor shaft 137 through a slip clutch which may be of any suitable type and is indicated generally as 138. The driving shaft 48 which also serves as the guideway for the guiding arm 41, previously fully described, is provided with a toothed portion 139 near the end plate 26 for engaging the gear 112 on the control assembly 36. The motor 133, therefore, rotates the control member 27 through the above defined gear train. The motor is of reversible type and is diagrammatically illustrated in Fig. 9 as having a field F, the flow of current through which may be reversed by a reversing switch 141 assembled on the frame means 20 as a part of the tuning device and common to all of the latches 117. Operative engagement of the switch 141 with each latch 117 is accomplished by the positioning of a spring switch arm 142 in a recess 140 (Figs. 3 and 7) formed at the end of the latch arm 121 near the tip portion 119 thereof.

In the operation of the tuning device of Fig. 1, and after the control rings 82 are each set to a predetermined angular position with reference to the shaft member 27, as will be explained, the peripheral portions 83 of the rings 82 and the friction discs 88 are compressed axially as an assembly and frictionally retained against movement relative to the flange 32 and hence to the shaft 27. With the control member assembly thus arranged, assume the latches 117 to be in their rest positions so that the relative position of each latch and switch mechanism 141 is as shown in Figs. 3 and 10. The engagement of the switch spring arm 142 with the contact 143 indicates a position of the latch tip 119 on the high side H of a control ring as indicated in Fig. 10. On closing of a push button 149, the magnet corresponding thereto and the motor 133 are substantially concurrently energized, rotation of the control assembly 36 being in a clockwise direction as indicated by the arrow in Fig. 10. By virtue of this direction of rotation the tip 119 of the latch 117 passes over the recess R and upon the low side L of the control ring. On dropping of the tip 119 from the high side H to the low side L the switch arm 142 is moved out of engagement with the contact arm 143 and into engagement with the contact arm 144, this arrangement of the switch mechanism 141 being indicated in Fig. 11. Referring to Fig. 9 it is seen that the closing of contacts 142 and 143 closes the motor circuit through conductor 143a which is connected to one side of the motor field F, with closing of contacts 142 and 144 connecting conductor 144a with the opposite side of the field F to close the motor circuit. Thus the action of switch 141 in response to the movement of the latch from the high side H to the low side L of a control ring serves to reverse the flow of current through the motor field F whereby to reverse the motor and hence the direction of rotation of the control assembly 36. Rotation in this reversed direction, indicated by the arrow in Fig. 11, continues until the stop 118 at the recess R engages the tip 119 as shown in Fig. 7. On release of the selected push button 149 the motor and the selected magnet are deenergized, the selected latch being moved to a rest position by a corresponding spring 129 whereby the spring switch arm 142 is permitted to move out of engagement with the contact 144 and into engagement with the contact 143. Thus on later energization of the motor the switch 141 is set to provide for the rotation of the motor 133 in a direction which rotates the control assembly 36 in a clockwise direction as viewed in Fig. 10. Of course, if a latch on energization of its corresponding magnet is moved directly into engagement with the low side L of a corresponding control ring 82, the contacts 142 and 144 will be immediately closed to provide for a rotation of the motor 133 in a direction to move the stop portion 118 at the recess R directly into engagement with the latch tip 119.

Before the control mechanism 37 is operated for tuning purposes described above, all of the control rings 82 or at least a number corresponding to the number of stations it is desired to tune, are set in predetermined angular positions corresponding to the tuning positions of the inductance units 51a—51c for each of the desired stations. Insofar as the operation of the tuning device is concerned, it is to be understood that variable capacitance means may be utilized in place of the inductance units 51a—51c within the teaching of this invention. It is evident, of course, that the capacitance tuning means, such as a variable condenser, would be operatively connected with the control member 27 so as to be operated thereby. Assuming that the screw 96 and its associated mechanism including the levers 107 are in a non-friction position, a selected button 149 is pushed in to complete the connections through contacts 130a—130b and 130c, to in turn energize a corresponding magnet 123 and the motor 133. This causes the corresponding control ring 82, which is still held under a slight friction by the spring washers 114, to rotate until the tip 119 of the latch 117 drops into the recess R of the ring. The operator then either releases the button 149 entirely and returns it only far enough to engage the contacts 130a and 130b, or originally lets the button move out of engagement with contact 130c thus maintaining the magnet circuit closed and breaking the motor circuit.

With the selected push button 149 held to energize a corresponding magnet 123, the control member 27 is manually rotated by an ordinary manual tuning knob at the radio receiver or at a remote control unit, the knob being operatively connected by a flexible cable or the like with a moulded coupling 148 secured to the driving shaft 48. This rotation of the control member 27 relative to the held ring 82 continues until the core elements 49 are moved to a tuning position corresponding substantially to the signal frequency desired. With the core elements at this position the cam means 62 associated with each thereof is adjusted to in turn relatively adjust the cores 49 to effect a matching or aligning of the inductance units at the tuning position. The predetermined matching of the units 51a—51c at the desired frequency can be ascertained by listening, or by using an output meter. Alternatively the units 51a—51c may be matched in a separate and preliminary tuning operation in which the cams 62 are set to bring all of the circuits into alignment before final assembly. When this relative aligning of the inductance units 51a—51c is completed the button 149 is released to open the magnet energizing circuit. It is understood, of course, that during this tuning operation that the contacts 130a—130c for closing the motor circuit are open by virtue of the slight retraction of the push button out of engagement with the contact 130c. The same procedure can be followed for each of the control rings 82. With a peripheral portion 83 of each ring separated from the peripheral portion of each other ring in the control assembly 36 by the axially yieldable but angularly fixed discs or separators 88, there is no possibility of any relative movement between a peripheral portion of the control ring 82 and the shaft 27, to cause any displacement of the control rings previously set.

When the setting operation for the rings 82 is completed the screw 96 is rotated so as to move the threaded support 106 outwardly from the cavity 97 or to the left as viewed in Fig. 1, whereby to pivot all of the levers 107 to compress the rings and separator discs of the control assembly against the annular flange 32. Although a screw with an ordinary slotted head is illustrated for turning by an ordinary screw-driver, it is apparent that a suitable knob can be employed for turning by hand.

From a consideration of Figs. 1 through 4, it is seen that all of the defined elements of the tuning device are entirely enclosed within the confines of the frame means 20 and preassembled therewith as a complete unit without requiring any intermediate partition or supporting plates. The entire assembly is thus substantially open and readily accessible for assembly and servicing purposes.

In the modified form of the invention shown in Figs. 12–19, the tuning device is illustrated with both inductance and capacitance tuning means which are adapted to be operated simultaneously by a common driving means to vary the effective inductance and capacitance in the radio frequency circuit to predetermined values. As is shown in Figs. 12 and 15, the tuning device includes frame means having end walls 161 and 161a, side walls 162 and 162a, a base 163 and a top 164. A control member 27' is rotatably supported in the end walls 161 and 161a by adjustable thrust bearings 166, one end of the control member 27' having a cylindrical body portion 167 thereon and the other end 165 thereof carrying a control member assembly 36'. The body portion 167 is formed on the periphery thereof with spaced spiral grooves 168 adapted to receive in mating engagement corresponding follower portions 169 (Fig. 18) provided on a slidable sleeve or driving member 171. The sleeve member 171 is integrally formed with an annular flange 172 having a radially extending bifurcated arm 173 for guidably engaging a drive shaft 48' arranged in spaced parallel relation with the control member 27' and rotatably supported in the end plates 161 and 161a. The annular flange 172 is connected by connectors 160 with the core elements 49' of the inductance units 51', three of which are illustrated angularly spaced about the control member 27' with the core elements 49' being axially movable thereof. On rotation of the control member 27', the core elements 49' are moved axially thereof in a manner substantially similar to that for the core elements 49 as was fully described in connection with the embodiment of Fig. 1, the bifurcated arm 173 and shaft 48' cooperating to retain the sleeve 171 against rotation but permitting movement thereof axially of the control member 27'. It is seen, therefore, that all of the core elements 49' are initially set in a predetermined relative position which is maintained at all times by virtue of their direct connection with the slidable sleeve 171.

With reference to the schematic electrical circuit in Fig. 19 an inductance unit 51' is illustrated as being included in the antenna circuit 151, a first RF stage 152 and a first detector stage 153; the plate of the detector tube 154 being in series connection with the primary 155 of a first IF transformer, and the unit 51' in the RF stage being in series connection with the plate of the RF tube 156 and the control grid of the detector tube 154. The oscillator elements of the detector tube 154 are connected with the unit 51' in the first detector stage. Each unit 51' is electrically associated with a corresponding variable capacitance unit 174 which is utilized in place of a usual padder condenser for a purpose to be now fully described.

Each condenser unit 174 includes adjustable cam means having an annular cam plate 176 with a peripheral portion thereof of about 180° being formed with angularly spaced radially extending blade elements 177 (Figs. 12, 13 and 14). Concentric with the annular plate 176 and arranged on each side thereof against the blade elements 177 are flexible bronze rings 178 which are suitably secured as by rivets 179 to the plate 176 at an unformed portion thereof. The flexible bronze rings 178 are relatively thin so as to maintain a following relation with the sides of the blade elements 177. It is evident from Fig. 13, therefore, that any adjusting or deflecting of the blade elements 177 laterally of the plane of the plate 176 will correspondingly move the annular rings 178 laterally of the annular plate 176 to form a continuous cam surface over the bladed portion of the plate. The plate 176 is formed with an enlarged eccentric opening 181 and an interlapping concentric opening 182, the control member 27' being inserted through the opening 181 and into frictional engagement with the plate 176 by the seating of the plate at the opening 182 into a corresponding annular recess 183 formed in the control member 27', this construction being clearly shown in Fig. 14.

Cooperating with each side of the cam plate 176 is a pair of condenser plates 184 and 186, each pair being operatively associated with one of the cam rings 178 (Fig. 13), and mounted at corresponding ends in a spaced relation on a bracket 187 supported on the frame base 163.

The leads 188 and 189 for the condenser plates 184 and 186, respectively, are shown in Fig. 14. Since each pair of plates 184 and 186 is similarly assembled relative to the cam plate 176, only one thereof will be described. The plate 184 is stationary and of a rigid construction while the plate 186 is adapted to be moved relative to the fixed plate 184. This moving of the plate 186 is accomplished by its operative connection with the cam ring 178 through an insulating contact or follower 191 provided at the unsecured end thereof. The plate 186 is arranged relative to the cam ring 178 so that the follower 191 is always in engagement therewith. The effective rotation of the cam plate 176 is about 180°, as indicated in Fig. 14 by the peripheral portion thereof formed with blades 177, and is commensurate to the total linear movement of a corresponding core element 49'. That is, the total linear movement of a core element 49' in one direction will occur for an angular displacement of the cam plate 176 of 180°. The follower 191, therefore, is always opposite a bladed portion of the plate 176. Thus, on rotation of the control member 27', the plate 186 is continuously moved relative to the plate 184 by virtue of its engagement with the cam surface 178, this back and forth movement of the plate 186 acting to continuously vary the capacitance of the condenser unit 174 to predetermined values. The condenser unit 174 is thus seen to be comprised of two condensers arranged in a balanced relation relative to a control member 27' and including a common adjustable cam 176. Because of this construction and relative assembly of the unit 174, adjustments can be made on the cam 176 without applying such unequal or disturbing forces on the shaft as would alter previously made adjustments elsewhere in the tuning device. It is to be understood, of course, that each pair of condenser plates 184—186 may be connected together in either a series or a parallel relation.

In the operation of the tuning device of Fig. 12, it is contemplated that the capacitance effect in the tuned circuits be complementary to the inductance effect therein and adjustable relative to the inductance effect to compensate for the usual inaccuracies and errors which occur in inductance tuning of permeability type and to provide for a predetermined tuning performance over a complete tuning frequency range. Thus the core elements 49' of the inductance units 51' are first set to relative fixed positions at the low frequency in a desired frequency tuning range, this fixed adjustment being accomplished by suitably securing the connectors 160 which connect the core elements 49' with the annular flange 172 of the slidable member 171. With the core elements 49' retained at this initial fixed adjustment, the effective inductance and capacitance in the tuning circuit at certain intermediate tuning frequencies is varied through adjustment only of the capacitance by deflecting the blades 177 in each of the units 174 to change the capacitance of the condenser unit by a complementing amount sufficient to compensate for the error in the inductance effect in the circuit at such certain frequencies. When the condenser units 174 have been thus adjusted at the certain desired frequencies over the entire frequency range, such adjustments will be retained on later rotation of the control member 27' to such frequencies by virtue of the control member 27' being the common driving means for both the capacitance units 174 and the inductance units 51'. The condenser units 174 are thus continuously adjusted to a predetermined value at each desired frequency concurrently with the adjustment of the cores 49 to relative tuning positions through the action of the cam plate 176 and its associated cam surface 178 which serve to continuously vary the distance of the movable plate 186 relative to the stationary plate 184. Because of the simultaneous complementary variation of the effective inductance and capacitance values in the tuning circuit, high performance of a uniform quality is obtained over a complete tuning range.

The control member assembly 36', in the control mechanism 37' for selectively rotating the control member 27' to control positions corresponding to predetermined tuning positions, is comprised of control rings 82 and separator discs 88 which are similar in all respects to the like parts described in connection with the embodiment of Fig. 1. The hub portions 84 of the rings 82 and the separators 88 are held together against axial and angular movement by screws 193 (Figs. 12 and 15) which are secured at one end to a plate 194 mounted in a fixed position on the control member 27'. The clamping of the circumferential portions of the discs 88 and of the peripheral portions 83 of the rings 82, is accomplished by means including a clamping plate 196 mounted for slidable movement axially of the member 27' and having apertures therein for loosely receiving the screws 193. The control member 27', at the end 165 thereof, is formed with a threaded portion 197 which extends along the member 27' substantially to the outer end of the control assembly 36'. Threadably mounted on the portion 197 and engageable with the clamping plate 196 to move the same in a clamping position against the control assembly 36' is an adjusting nut 198 which constitutes a hub for a gear 199 in operative engagement with a gear 201 carried by the driving shaft 48'. Axial movement of the adjusting nut 198 in one direction on the member 27' is limited by its clamping position against the control assembly 36', while its axial movement in an opposite direction is defined by its engagement with a back stop 202 mounted at the extremity of the end 165 of the control member 27', a spring washer 203 being positioned between the nut 198 and the back stop 202 to provide a yieldable buffer for the nut 198.

The drive shaft 48' is provided with a manual control knob 204, rotation of which rotates the member 27' through the gears 199 and 201. On rotation of the control knob 204 in one direction, the member 27' rotates until a lug 206 formed on the plate 194 engages a stop 207 carried by the frame base 163. After this engagement the continued rotation of the knob 204 serves to axially move the clamping nut 198 along the control member 27' and against the clamping plate 196 to move the same against the control assembly 36'. By virtue of this stopping of the control member 27' a positive clamping of the control rings 82, after a setting thereof, against angular and axial movement, is assured. Ball bearings 205 positioned intermediate the nut 198 and the clamping plate 196 reduce friction therebetween and provide for a tight clamping action. Of course, in some instances a brass washer or the like may be used in place of the balls 205. To unclamp the control rings 82, the control knob 204 is rotated in a reversed direction, the rotary member 27' rotating through substantially 180° until a lug 208 arranged on the plate 194 diametrically from the lug 206 engages the stop portion 207. This stop action permits the adjusting nut 198 to be loosened and axially moved against the back stop 202, this loosening being just sufficient to permit of a slight residual frictional holding pressure on the ring peripheral portions 83 by the separators 88 and plate 196. Clamping and unclamping of the control member assembly is thus obtained by utilization of the manual tuning means or control knob 204.

Cooperating with each ring 82 in the control assembly 36' is a corresponding latch 209 (Fig. 15), each of which is rigidly mounted at one end 210 on a bracket 211 carried by the top plate 164 of the tuning device frame means. Each latch 209 has a body portion 212 of substantially flat form with all of the latches 209 being longitudinally spaced with the body portions 212 in parallel relation. Each latch 209 near its supported end is formed with a recessed or cutaway portion 213, the curvature and extent of the recess 213 being such that the latch 209 is bendable in a direction substantially at right angles to the plane of the body portion 212. This bending of the latch 209 completely eliminates the usual lost motion which occurs through pivoted or like connections. The end 215 of each latch 209 is provided with an operating tip 220 which cooperates with the periphery of a corresponding ring 82 to control the rotation of the member 27' in a manner fully described above in connection with Fig. 1. Ability of the latch to bend at right angles to the body portion 212 thereof provides for a tip portion 220 which may be given any desired width for strength and rigidity purposes. Also similarly to the embodiment of Fig. 1, six latches 209 (Fig. 16) are illustrated in the present embodiment corresponding to the number of control rings 82 shown in the control assembly 36'.

Bending movement of a latch 209 in the operation of the control mechanism 37' is accomplished by a corresponding magnet 214 including an associated armature 216, the armature being connected with the latch 209 through a strut or connecting member 217. Each strut 217 (Figs. 15 and 17) is of substantially channel shape, having base extending portions 205 at each end thereof adapted to be bent into hooked engagement with apertures 205a and 205b provided respectively in each latch 209 and armature 216, respectively. The magnets 214 are arranged in two parallel rows of three each, and mounted on a bracket 218 of substantially U-shape which is supported on the top frame member 164. Each leg 219 of the bracket 218 carries a plate 225 (Fig. 16), each of which pivotally supports the armatures 216 corresponding to a row of magnets 214, the armatures having one end thereof in dove-tailed engagement with a corresponding plate 225. Each armature is normally held in an open position relative to its corresponding magnet by an associated coil spring 221 connected at one end 222 to a corresponding armature and at its opposite end to an armature supporting plate member 225.

The magnets 214 are electrically connected to provide for their selective energization by corresponding push button units 230. Thus as shown in Fig. 19, the magnets 214 are connected in parallel between power leads 231 and 232 from the secondary 233 of a usual power transformer. Lead 231 is connected directly to the secondary 233 while lead 232 has a tuning motor 234 and motor switch 235 connected therein in series with each of the magnets 214.

The magnets 214 and armatures 216 are illustrated as adaptable for A. C. operation. It is to be understood, of course, that D. C. magnets and armatures may also be used. Each armature 216 on the side thereof opposite the pole face of a corresponding magnet has a plurality of flat springs 223 arranged thereon in a superposed relation and secured by a rivet 224 to one end of the armature 216. The spring indicated as 223a and positioned immediately adjacent the armature 216 extends outwardly from the other end of the armature for connection at the aperture 205b therein with a corresponding end 205 of the strut or connecting member 217, the other end 205 of the strut being connected directly to the body portion 212 of a corresponding latch 209 at an aperture 205a. As is clearly shown in Fig. 16 the extending ends of the springs 223a corresponding to oppositely arranged armatures 216 are faced toward each other so that all of the struts 217 are positioned together in two adjacent rows to provide for their being connected with a corresponding latch 209, the latches being assembled transversely of the member 27' and spaced axially thereof across the control assembly 36'. When a magnet 214 is energized, as by the closing of a push button 230, a corresponding armature 216 is immediately attracted to a closed position so as to eliminate any chattering action or hum regardless of the operating position of the latch tip 220 relative to the periphery of its corresponding control ring. In other words, the armature 216 moves to a completely closed position entirely independently of the position of the latch 209 relative to a corresponding control ring, with such closing action by virtue of the springs 223 and the flexibility of the latch 209 permitting the latch tip 220 to engage any part of the peripheral portion 83 of the control ring. On de-energization of the selected magnet 214 its armature 216 is pulled to an open position by the action of the spring 221. During this movement to an open position, the armature engages the lowermost spring 223a assembled thereon so that all of the springs 223 and the armature 216 are moved concurrently to positively move the latch tip 220 out of an engaging position with the recess R in a corresponding control ring. It is seen, therefore, that on closing of the armature the spring connection of the latch 209 therewith coacts with the initial tension in the latch to move the same into an engaging position with an associated control ring, while the latch on movement of the armature to an open position is positively pulled out of an engaging position with the control ring because of the pick-up action of the armature 216 relative to the springs 223.

As previously mentioned, the tuning motor 234 is arranged in the circuit of the magnets 214 (Fig. 19) so as to be energized concurrently with each thereof. Similarly to the operation of the reversible motor 133 and control assembly 36 in the embodiment of Fig. 1, the motor 234 is also of reversible type with reversing thereof being controlled by the switch unit 235 in response to the moving of a tip 220 of a latch 209 from the high side H to the low side L of a corresponding control ring 82. With reference to Fig. 12 it is seen that the motor 234 is mounted on the end plate 161a of the tuning device frame means, with the motor shaft 243 extending outwardly therefrom. A slip clutch indicated generally as 244 is mounted on the projecting end of the motor shaft 243 and includes a pinion 245 in meshing engagement with a gear 246 carried by the shaft 46'. Since the shaft 46' also carries the pinion 201 previously mentioned, which is in engagement with the gear 199 on the adjusting hub 198, a driving gear train is established between the motor 234 and the control assembly 36'.

The motor switch unit 235 is supported on the frame top plate 164, and includes a gate or switch arm 237 which is common to all of the latches 209, one end thereof being received in a recess 242 formed in the operating end of each latch 209 so as to be movable in response to the movement of such operating end. Cooperating with the switch unit 235 in the operation of the tuning motor 234 is a phasing condenser 236 for controlling the motor torque and direction of rotation. Thus with the latch tip 220 riding on the high side H of a corresponding control ring 82, the switch arm 237 (Figs. 15 and 19), which is connected with lead 232 is in contact with a second switch arm 238 to close the motor circuit through conductor 239. On movement of the latch tip 220 to the low side L of the control ring, the switch arm 237 moves into contact with a third switch arm 240 and out of contact with the arm 238 to the position shown in Figs. 15 and 19 to close the motor circuit through the conductor 241. The movement of the arm 237 is controlled through its engagement with a latch 209 at the recess 242 in the operating end thereof. It is evident, of course, that the closing of the motor circuit through the conductors 239 and 241 reverses the current flow through the motor to in turn reverse its direction of rotation. When the latch tip 220 drops into a corresponding recess R the switch arm 237 moves the third switch arm 240 into engagement with a fourth switch arm 243 which is connected to the conductor 239. Since the switch arm 237 continues in contact with arm 240, condenser 236 is shorted and current flows through both windings of the motor with the result that no torque is produced, and the motor "locks." The motor 234 is thus automatically stopped when a latch tip drops into a recess R, the selected magnet remaining energized until its corresponding push button 230 is released.

An "off" control button for the circuit of the radio receiver with which the tuning device is employed, is indicated at 247 (Fig. 19) for controlling a heater circuit 248 and a usual B circuit 249 including a rectifier tube 250. Power for the circuits 248 and 249 is supplied from a transformer 251, the primary 252 of which may be connected to a suitable source of A. C. supply. The control button 247 is connected by a conductor 253 with lead 231 and a switch arm 254 of a power supply switch 255 which cooperates with the control assembly 36' to control the operation of the heater circuit 248 and B circuit 249. Referring to Figs. 12, 15, and 19, it is seen that the power supply switch 255 is mounted on the side plate 162 of the tuning device frame means and includes a gate member 256 common to the plates 194 and 196 of the control assembly 36' and having followers 257 and 258 adapted to fit within a corresponding recess 259 and 260 on the periphery of the plates 194 and 196, respectively. The common gate 256 is operatively associated with an A switch for the heater circuit including switch arms 261, 262, and the switch arm 254 connected with the "off" button 247, and with a B switch included in the B circuit 249 and having switch arms 263, 264, and 265. As clearly appears from Fig. 12 the switches A and B form part of the structure of the power supply switch 255.

The recesses or notches 259 and 260 formed in the plates 194 and 196, respectively, are in alignment axially of the control member 27' so that the follower portions 257 and 258 move in unison to operate the gate 256. When the follower portions 257 and 258 are riding on the periphery of a corresponding plate, all of the switch arms corresponding to a switch A and B are in contact engagement to close their respective circuits as shown in Fig. 19. When the followers 257 and 258 are received in a corresponding recess 259 and 260, the gate member 256 is permitted to move inwardly of the control assembly 36' and in turn permits all of the switch arms in a corresponding switch A and B to move to open positions, as indicated in Fig. 15, whereby to open their corresponding circuits. In the practice of this invention, it is contemplated that this open position of the switches A and B occur when the tuning means 51' and 174 are in one of their extreme tuning positions.

This extreme tuning position is obtained by closing the "off" button 247 which sets up a circuit through conductor 253 and switch arms 254 and 262 to ground at G. Since lead 232 is also grounded at G', a circuit is established which causes the motor 234 to rotate in such a way as to rotate rings 82 and plates 194 and 196 in a clockwise direction as viewed in Fig. 15. This rotation continues until notches 259 and 260 reach buttons 257 and 258 opening the gate 256 and consequently opening the switches A and B to stop the motor and also open the circuits 248 and 249, thus turning the set off. The receiver is automatically turned on when any of the station buttons 230 are closed, since this rotates plates 194 and 196 to move the gate 256 to close the switches A and B as shown in Fig. 19. When turning the set on, it is only necessary, therefore, to press a push button corresponding to the station which is to be heard. On actuation of this push button the control mechanism 37' is operated to tune in the selected station and concurrently moves the followers 257 and 258 on the gate member 256 out of their corresponding recesses. The circuits 248 and 249 are thus simultaneously closed so that the radio receiver is automatically turned on with the pressing of a push button corresponding to the selected station. An individual power relay for "off" and "on" operation is thus entirely eliminated, since the tuning motor 234 is used to operate the power supply switch 255.

Before the control mechanism 37' is operated for tuning, all of the control rings 82 are set in predetermined angular positions corresponding to the tuning positions of the inductance units 51' and condenser units 174 for each of the desired stations. In Fig. 12 there is shown a rotary dial 266 for indicating station positions, the dial being viewable through an aperture 267 formed in the panel 268 of the radio receiver. The dial is formed with a gear portion 269 for engaging a pinion 270 mounted on the shaft 48' and in frictional slip engagement therewith, spring 271 and collars 272 and 273 acting as a slip clutch. With the adjusting screw 198 in a clamping position relative to the control member assembly 36', rotation of the manual control knob 204 to unclamp the control assembly 36' initially rotates the control assembly until the lug 208 engages the stop 207. The continued rotation of the knob 204 after this engagement serves to unclamp the control assembly 36'.

The dial 266 and the control assembly 36' are arranged for synchronous movement so that the control position of the control member 27' will always be properly indicated by the dial. Retention of this synchronous operation is accomplished by providing oppositely arranged ear or lug portions 274 and 275 on the dial 266, which are adapted to engage a stop portion 276 provided on the end plate 161a of the tuning device frame means. The lugs 274 and 275 are arranged relative to the lugs 206 and 208 on the plate 194 so that the rotation of the dial 266 by the shaft 48', is stopped concurrently with the stopping of the control assembly 36'. The continued rotation of the shaft 48' to unloosen the nut 198 produces no rotative effect on the dial 266 by virtue of the slip between the pinion 270 and the shaft 48'. When the control assembly 36' is to be clamped the lug 275 on the dial 266 engages the stop 276 concurrently with the engaging of the lug 208 on the plate 194 with the stop 207. The synchronous relation between the dials 266 and the control assembly 36' is thus retained between the extreme limits of their movement, regardless of the indeterminate amounts at which the adjusting nut 198 may be rotated by the shaft 48' in the clamping and unclamping of the control assembly 36'.

When the control assembly 36' is in a non-friction position, setting of a control ring 82 to a predetermined angular position is accomplished by closing one of the push buttons 230, a peripheral portion 83 of a corresponding control ring 82 by virtue of the slight friction retained in the assembly 36' when it is in an open position, being rotated until the tip 220 of a corresponding latch drops into the recess R thereof. As previously mentioned, the dropping of the tip 220 in the latch R automatically stops the operation of the tuning motor 234. With the selected push button held down, the control knob 204 is rotated to indicate a desired station, the station being tuned in by simultaneous actuation of inductors 51 and capacitors 174, the capacitance units 174 being precisely adjusted as above described. The selected push button is then released. A similar procedure is followed in the setting of the remaining control rings, each adjusted control ring being held in a set position by virtue of the slight frictional engagement therebetween, and between the separator discs when the control assembly 36' is in a non-friction position. On adjustment of all of the control rings the adjusting nut 198 is moved by the operation of the manual control knob 204 into a clamping position. The control knob 204 thus functions to manually tune the radio receiver, and to clamp and unclamp the control assembly 36'.

Although the invention has been described with reference to several preferred embodiments thereof, it is to be understood that it is not to be so limited since modifications and alterations can be made therein which are within the full intended scope of the invention as defined by the appended claims.

I claim:

1. A tuning device having a plurality of inductance units therein, each of which has an adjustable core element, means common to all of said core elements and operatively connected therewith to simultaneously move the same to a plurality of tuning positions, means individual to each inductance unit for adjusting the corresponding core element relative to the remaining core elements to provide for a matched tuning relation between said inductance units at each tuning position, and means movable with said common driving means operatively connecting each of said adjusting means with a corresponding core element, said latter means cooperating with said adjusting means to relatively vary the rates of travel of said core elements to a tuning position so that said matched tuning relation is accomplished concurrently with their simultaneous movement by a driving means to said tuning position.

2. In a tuning device having a plurality of inductance units, each of said units having a linearly adjustable core element, control means common to said core elements and operatively connected therewith for simultaneously moving the same to a tuning position, cam means for each of said inductance units having a cam surface arranged substantially parallel to the path of movement of a corresponding core element, and a cam follower member carried by said control means and operatively connecting a cam surface with a corresponding core element, with each cam surface being adjustable transversely of the path of movement of a corresponding core element to relatively adjust the core elements to effect a matched tuning relation of said inductance units at each tuning position, and each of said followers on movement of said core elements to a tuning position cooperating with an associated cam surface to vary the rate of travel of a corresponding core element relative to the rate of travel of the other core elements so that said core elements in said tuning position are relatively arranged to provide for said matched tuning relation of the inductance units.

3. Radio tuning apparatus including a rotary control member, means for rotating said control member to predetermined control positions, inductance tuning means having an adjustable core element linearly movable axially of said control member, means operatively connecting said core element with said control member including a slidable member mounted on said control member, and means retaining said slidable member against rotation with said control member but permitting movement axially thereof, said rotary control member having a spiral groove in the periphery thereof and said slidable member having a follower portion adapted to be received in said groove, with said follower portion on rotation of said control member to a predetermined control position being moved along said groove to axially move said slidable member which in turn linearly moves said core element to a tuning position corresponding to said control position.

4. Radio tuning apparatus having a rotary control unit, a plurality of inductance tuning means, each of which includes a core element linearly movable to a plurality of tuning positions over a wide frequency range, means for simultaneously moving said core elements in response to a rotation of said control unit including a sliding member common to said core elements and mounted on said control unit for slidable movement axially thereof, means retaining said sliding member against rotation with said control unit but permitting movement axially thereof, said control unit having a spiral groove in the periphery thereof for receiving in following engagement a follower portion provided on said sliding member, means operatively connecting each of said core elements with said sliding member, and an adjustable cam means operatively connected with each of said connecting means, with adjustment of a cam means linearly moving a corresponding core element to a tuning position relative to the other core elements, said follower portion and groove on rotation of said control unit co-acting to axially move said sliding member, and a cam means and a corresponding connecting means cooperating to control the rate of movement of a corresponding core element to a tuning position in accordance with the predetermined adjustment of said cam means.

5. In a tuning device having a plurality of inductance units, each of which includes a linearly adjustable core element, and means common to said core elements for simultaneously moving the same to relative tuning positions, the combination of means for individually adjusting a core element at a tuning position to provide for an aligning of said inductance units at said position including cam means for each of said core elements having a cam surface arranged substantially parallel to the linear path of movement of a corresponding core element, means for adjustably varying the contour of said cam surface, means engageable with a cam surface and operatively connected with a corresponding core element to linearly move said core element in accordance with said cam surface adjustment, and means movably supporting said latter means on said common means so that each of said latter means on movement of said core elements to a tuning position is moved over a corresponding cam surface to in turn regulate the movement of a corresponding core element to its preadjusted position at said tuning position.

6. A tuning device for tuning a radio receiver over a wide frequency range including a radio frequency circuit having an inductance and a capacitance, with the effective inductance in said circuit being substantially greater than the effective capacitance therein so that tuning is substantially accomplished by said inductance, means for adjusting said capacitance at each tuning position relative to said inductance to provide precision tuning characteristics of said circuit over said frequency range, with said adjustments being retained over said frequency range, said adjusting means comprising a rotary multipart cam with said parts being adjustable, a cam strip engaging said parts and varying in contour in accordance with the position of said parts, and a cam follower acting on said capacitance upon movement of said rotary cam and control means for simultaneously varying the effective inductance and capacitance values in said circuit to their predetermined values at each tuning position.

7. A tuning device for tuning a radio receiver including a radio frequency circuit with a plurality of inductance units therein, each of which includes an adjustable core element, a capacitance unit in said circuit corresponding to each of said inductance units, movable means common to said core elements for retaining the same in fixed relative positions, a control member operatively connected with said common means to move the same and in turn simultaneously move said core elements to a tuning position, and adjustable means for each of said capacitance units for changing the effective capacitance of said capacitance units at each tuning position to values which compensate for any misalignment in the tuning relation of said inductance units, and means operatively connecting said adjustable means and control member so that the effective inductance and capacitance values in said circuit are varied simultaneously to their predetermined values at each tuning position.

8. A tuning device having variable tuning means for a radio receiver including an "off" and "on" switch, rotary control means operatively connected with said tuning means, said rotary control means including a drum portion with axially spaced recesses in the periphery thereof, a plurality of movable latches corresponding to certain of said recesses, with each of said latches having a stop portion thereon engageable with a corresponding recess to stop said control means at a predetermined control position, an actuating arm for said switch in operative engagement with said drum portion and having a follower portion thereon adapted to be received in one of the other of said peripheral recesses, said switch being in an "off" position when said follower is in said one recess, and in an "on" position when said follower is out of said one recess, with one of the control positions of said rotary control means providing for the dropping of said switch follower portion in said one recess, an operating magnet for each of said latches operatively connected with a corresponding latch to move the same into engagement with a corresponding recess, motor drive means for said rotary control means, and push button means for selectively actuating said magnets to individually operate said latches, with actuation of a push button after the actuation of the push button corresponding to said one control position providing for a rotation of said rotary control means to some other control position so that said switch follower portion is removed from said one recess to automatically turn on said radio receiver.

9. A tuning device for a radio receiver including variable tuning means, with said receiver having an operating circuit including a control switch therefor, rotary control means operatively connected with said tuning means including a drum portion having peripheral recesses spaced axially thereof, a plurality of movable latches corresponding to certain of said recesses, each of said latches having a stop portion formed thereon, with said control switch including an actuating arm with a follower portion thereon engageable with said drum and adapted to be received in one of the other of said recesses, said control switch when said follower portion is in said one recess being adapted to open said operating circuit and turn off said radio receiver, said switch being closed and the radio receiver on when said follower portion is out of said one recess, operating magnet means for each latch for moving a corresponding latch into engagement with said drum, means for selectively actuating said magnets, and motor drive means for said rotary control means electrically connected with said magnets so as to be energized concurrently with each thereof, with rotation of said control means being stopped on engagement of the stop portion on a selected latch with a corresponding recess, one of said magnets and a corresponding latch being used to stop said rotary control means when the follower portion on said control switch actuating arm is in said one recess to provide for the opening of said operating circuit to turn off said radio receiver, with said follower portion on actuation of any of the other of said operating magnets being moved from said one recess to close said switch and automatically turn on said radio receiver.

10. A radio tuning device including a plurality of inductance units each of which has a linear adjustable core element, control means for simultaneously moving said core elements to a tuning position, means for individually adjusting each of said core elements at said tuning position to align said inductance units, said adjusting means including a plate member supported in a position parallel to the linear path of movement of a corresponding core element, said plate having integrally formed blades spaced longitudinally thereof, flat flexible means yieldably supported on said plate and extending across one side of said blades to form a continuous cam surface thereover, with adjustment of said blades laterally of said plate varying the contour of said cam surface, and a follower member for said cam surface pivotally supported on said control means, and having one portion pivoted to a corresponding core element and a second portion operatively engageable with said cam surface, with adjustment of said blades moving said follower member to in turn linearly move its corresponding core element in accordance with said cam adjustment, with each of said core elements being always returnable to the preadjusted position at said tuning position by the cooperating action of a corresponding follower member and associated cam surface.

11. In a radio tuner having a rotary member for operative connection with radio receiver frequency changing means and having an assembly of a plurality of control members angularly adjustable on the rotary member and mounted near one end thereof, with said one end having a threaded portion, means for collectively clamping and unclamping the control members to the rotary member including a manual control member for rotating the rotary member, a clamping plate mounted at said one end of the rotary control member for axial movement against said control member assembly, a gear member having a hub threadable on the threaded portion of said rotary control member, means operatively connecting said gear member with said manual control member, means engageable with said control member assembly to define the limits of rotation thereof, with rotation of said manual control member in one direction rotating said rotary control member assembly to one limit of rotation and tightening said gear member against said clamping plate to accomplish clamping of said control members, and rotation of said manual control member in an opposite direction rotating said control member assembly to the other limit of rotation and loosening said gear member to unclamp said assembly, and means frictionally engaging said gear member and rotary member to provide for the rotation of said rotary member by said manual control means when said control members are unclamped.

12. In a radio tuner having a rotary member for operative connection with radio receiver frequency changing means and having an assembly of a plurality of control members angularly adjustable on the rotary member near one end thereof, with said one end having a threaded portion, means for collectively clamping and unclamping the control members to the rotary member including a clamping plate axially movable on the rotary control member against one end of said control member assembly, a rotary adjustable member threaded on said threaded portion and engageable with said clamping plate, a manual control member operatively connected with said adjustable member to rotate the same, means confining the rotation of said control member assembly between two stop positions, with rotation of said manual control member in one direction rotating said control member assembly to one stop position and tightening said adjustable member against said clamped plate to accomplish clamping of said control members, and rotation of said manual control member in an opposite direction rotating said control member assembly to the other of said stop positions and loosening said adjustable member to unclamp said control members, means for indicating a tuning position of said frequency changing means, means operatively connecting said indicating means with said rotary control member including said manual control member, and means including slip clutch mechanism providing for a rotation of said indicating means concurrently with said rotary control member.

13. In tuning means including a slidable element and means for moving said element to a plurality of tuning positions, the combination of means providing for a precision adjustment of said slidable element at each tuning position including a fixed cam portion adjustable transversely of the path of travel of the slidable element, and a follower portion for the cam portion movable with said moving means and operatively connected with said slidable element, with initial adjustment of said cam portion at a tuning position acting on the follower portion to move said slidable element independently of said moving means, with the preadjusted position of said slidable element being retained on later movement of said element to said tuning position by said moving means.

14. In tuning means, the combination of means providing for the precision adjustment of a linearly adjustable element at each tuning position over a wide range of frequencies including an operating member for said element, a fixed cam portion having an adjustable surface substantially coextensive in length with the linear movement of said element, and a follower portion engageable with said adjustable surface and operatively connecting said operating member and element, with initial adjustment of the cam surface at a tuning position acting on said follower portion to move said element independently of said operating member.

15. Tuning means including a linearly movable element, means for moving said element to a plurality of tuning positions, means providing for a precision adjustment of said element at each tuning position including an adjustable fixed portion, and a movable portion carried on said moving means operatively connected with said element and in sliding engagement with said fixed portion, with initial adjustment of said fixed portion at a tuning position acting on said movable portion to move said element independently of said moving means, with later movement of said moving means to a tuning position returning said element to a corresponding preadjusted position.

16. In tuning means including a tuning circuit having a longitudinally movable tuning element therein, the combination including rotary cam means having a spiral groove therein and means including a cam follower connecting said groove and said tuning element to move the latter upon movement of the cam means, and supplementary means for obtaining more precise tuning at each tuning position in said tuning circuit including a cam means having a cam surface, multi-parts individually adjustable to vary the contour of the cam surface, and a cam follower riding on said surface when said rotary cam means is operated, said supplementary means including said cam follower.

17. In tuning means having a longitudinally movable tuning element and means for moving said element, the means providing for precision adjustment of the position of said element at various tuning positions over the path of movement including in combination a multi-part cam portion substantially coextensive in length with the path of movement of said element, and with each of said parts being initially adjustable to provide all together a varied-surface path, and means operatively connecting said element, said means for moving said element, and said multi-part cam portion including a follower movable over said varied-surface path formed by the parts of said cam portion.

18. In tuning apparatus having a tuning circuit, the combination including a longitudinally movable tuning element, means for moving the same, and supplementary tuning means comprising a variable condenser, and means for varying the capacity of said condenser having a portion operatively connected with said moving means, a plurality of adjustable portions, a cam strip engaging said adjustable portions having a cam surface corresponding thereto, and a cam follower operatively connected with said variable condenser.

HAROLD F. ELLIOTT.